US006732361B1

(12) United States Patent
Andreoli et al.

(10) Patent No.: US 6,732,361 B1
(45) Date of Patent: May 4, 2004

(54) GENERATING COMBINATIONS OF OFFERS AND USING ACTION IDENTIFIERS FROM THE OFFERS TO OBTAIN PERFORMANCE OF COMBINATIONS OF ACTIONS

(75) Inventors: Jean-Marc Andreoli, Meylan (FR); François Pacull, Crolles (FR); Jean-Luc Meunier, Saint Nazaire les Eymes (FR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/363,308

(22) Filed: Jul. 28, 1999

(51) Int. Cl.[7] .................................................. G06F 9/46
(52) U.S. Cl. ........................... 719/313; 719/315; 705/5; 705/6
(58) Field of Search ................................ 709/315, 313; 705/5, 6, 53

(56) References Cited

U.S. PATENT DOCUMENTS 6,131,116 A * 10/2000 Riggins et al. ............. 709/219
6,304,918 B1 * 10/2001 Fraley et al. ............... 709/332
6,529,950 B1 * 3/2003 Lumelsky et al. .......... 709/218

OTHER PUBLICATIONS

Andreoli, Jean–Marc, XPECT: A Framework for Electronic Commerce 1997, IEEE, vol. 1, No. 4, pp. 40–48.*
Andreoli, Jean–Marc et al. "Multiparty Negotiation of Dynamic Distributed Object Services," Journal of Science of Computer Programming, vol. 31, 1998, pp. 179–203.
Andreoli, Jean–Marc et al. "Process Enactment and Coordination," Proceedings of the 5th European Workshop on Software Process Technology (EWSPT '96) held in Nancy, France; Oct. 9–11, 1996; pp. 195–216.
Andreoli, Jean–Marc et al. "XPECT: A Framework for Electronic Commerce," IEEE Internet Computing, vol. 1, No. 4, Jul.–Aug. 1997, pp. 40–48.

"CLF: The Coordination Language Facility Platform," Xerox Research Centre Europe. Research Fact Sheet, Published on the internet at www.xrce.xerox.com/research/ct/projects/clf/fs/clf/html, by Apr. 28, 1999.
Earley, Jay "An Efficient Context–Free Parsing Algorithm," Communications of the ACM, vol. 13, No. 2, Feb. 1970, pp. 94–102.
Forgy, Charles L. "Rete: A Fast Algorithm for the Many Pattern/Many Object Match Problem," Artificial Intelligence, vol. 19, No. 1, 1982, pp. 17–37.

(List continued on next page.)

Primary Examiner—Meng-Al T. An
Assistant Examiner—The Thanh Ho
(74) Attorney, Agent, or Firm—Oliff & Berridge, PLC

(57) ABSTRACT

In obtaining performance of a combination of actions, such as in a coordination or scheduling application, combination data indicating a combination of two or more action types can be obtained. The combination data could, for each action type, identify a service that can be performed by a networked server to provide an instance of the action type. Combinations of offers can be generated, with the offers in each combination together offering the combination of action types indicated by the combination data. In generating the combinations, inquiries can be provided to the servers or other sources of actions, with an inquiry indicating an action type and requesting offers offering to perform an action and indicating an action identifier for the offered action. The action identifiers from the offers in any of the generated combinations can be used to obtain performance of that combination of actions. Search engine operations can generate the combinations of offers, and transaction engine operations can use the action identifiers to obtain performance. The services can have variables that can be instantiated, and two services can share one or more variables, making them interdependent. An inquiry can be provided to obtain an offer to perform one of the services with values for the shared variables, and another inquiry can then be provided to obtain offers to perform the other service with the same values for the shared variables.

20 Claims, 12 Drawing Sheets

OTHER PUBLICATIONS

Gray, Jim et al. Transaction Processing: Concepts and Techniques, Morgan Kaufmann Publishers, Inc. San Mateo, California, U.S.A.: 1993, pp. 562–573.

Object Management Group The Common Object Request Broker: Architecture and Specification, Revision 2.0, Jul. 1995, Updated Jul. 1996; Also published on the internet at www.omg.org.

* cited by examiner

GENERATING COMBINATIONS OF OFFERS AND USING ACTION IDENTIFIERS FROM THE OFFERS TO OBTAIN PERFORMANCE OF COMBINATIONS OF ACTIONS

FIELD OF THE INVENTION

The invention relates to techniques that obtain performance of combinations of actions, such as coordination or scheduling techniques.

BACKGROUND

Various techniques have been proposed for coordinating and scheduling actions.

Andreoli, J.-M., Pacull, F., Pagani, D., and Pareschi, R., "Multiparty Negotiation of Dynamic Distributed Object Services", *Journal of Science of Computer Programming*, Vol. 31, 1998, pp. 179–203, describe Coordination Language Facility (CLF), a programming framework that extends object-oriented programming (OOP) with constructs that support dynamic services and multi-service coordination. CLF merges OOP with transaction systems that coordinate access to distributed resources, enabling coordination of multiple, distributed objects. A client object can communicate with multiple servers to negotiate consensus over a set of services that match complex criteria and to concurrently execute the services on each server while respecting consistency of global execution.

Andreoli et al. describe a set of CLF operations that support a negotiation dialogue between several server objects through a client object, where the client calls for and collects offers for various services it wants to combine in some constrained way, before deciding for one combination obtained by selecting one offer from each service. Another set of CLF operations support an elementary transaction mechanism so that a set of actions from different servers can be performed atomically; the client proceeds in two phases, first reserving each of the actions separately, and then proceeding based on the responses to reservations—if all are accepted, the client confirms them, but if one returns a hard rejection, the client cancels any that have been accepted and abandons the transaction, and if one returns a soft rejection, the client cancels any that have been accepted and defers the transaction unless a hard rejection has also been received.

As described by Andreoli et al., the CLF object model provides a straightforward model of coordination in which a primitive coordination action consists of atomic removal of a number of resources from some objects followed by insertion of resources into the same or other objects. The coordination action is specified by a production rule whose left-hand side lists properties of resources to be removed and whose right-hand side lists properties of resources to be inserted, each property being tagged with an identifier of a CLF object implementing the property. A coordinator continuously attempts to apply rules whenever they are active, following an adaptation of production rule engine algorithms: A search engine retrieves active rules and finds instantiations for their left-hand sides; a transaction engine attempts to consume atomically the left-hand side of rules for which the search engine has found a complete instantiation and insert their right-hand side; and surrogates handle communications with remote servers.

SUMMARY OF THE INVENTION

The invention addresses a problem that arises in performing coordination using both search techniques and transaction techniques, such as with the search engine and transaction engine described in the Andreoli et al. article discussed above. Although the transaction engine described by Andreoli et al. atomically consumes the left-hand side of rules for which the search engine has found a complete instantiation, no specific technique is disclosed for passing information between the search engine and the transaction engine to make this possible. In practice, bottlenecks can develop as the number of offers received increases.

The invention alleviates this problem by providing a technique in which each offer indicates an identifier of an action that is offered. The technique obtains combination data indicating a combination of two or more action types and generates one or more combinations of offers, where the offers in each combination together are offering the indicated combination. In generating combinations of offers, the technique provides inquiries to sources, with each inquiry requesting offers that offer to perform actions of one of the action types and that each indicate an action identifier. The technique then uses the action identifiers from any of the generated combinations to obtain performance.

The technique thus provides an elegant way to collect data that a search technique can use to generate a combination of offers, data that a transaction technique can also use to obtain performance of each action. As a result, the technique can be used to simply yet effectively integrate search and transaction techniques.

The sources of actions can be servers, and the combination data can indicate a service identifier for each action type, identifying a service that can be performed by a server to provide an instance of the action type. The servers can be accessible through a network, and can perform services by executing instructions, so that the method can coordinate distributed software actions.

The combination of action types can be a conjunction, and the method can associate action identifiers from offers with service identifiers from the combination data, thus generating a combination of offers. The method can determine whether all service identifiers have associated action identifiers, thus determining whether the offers in a generated combination together are offering the combination of action types indicated by the combination data.

The combination data can also indicate a set of variable identifiers for each service identifier, with each variable identifier identifying a variable that is applicable to the service identified by the service identifier. The sets of variable identifiers for first and second service identifiers can both include one or more shared variable identifiers identifying shared variables applicable to both. The method can provide a first inquiry to servers that can perform the first service, indicating the first service with the shared variable unspecified and requesting offers that offer to perform the first service. After receiving at least one offer in response to the first inquiry, offering to perform the first service with a specified value of the shared variable, the method can provide a second inquiry to servers that can perform the second service. The second inquiry can indicate the second service with the specified value of the shared variable from one of the offers and can request offers that offer to perform the second service with the specified value of the shared variable.

Where the combination is a conjunction, the method can also provide a reserve request to the source of each offer in the generated combination of offers, indicating the offer's action identifier and requesting a return communication indicating whether the offer is available and reserved. If all the offers in the generated combination are available and reserved, the method can provide a perform request to the source of each offer, indicating the offers action identifier and requesting performance. The reserve request can also indicate a requester identifier and request that the source reserve the action for the identified requester.

The technique can also be implemented in a system with processing circuitry and connecting circuitry for connecting the processing circuitry to sources of action. The processing circuitry can obtain combination data, can generate one or more combinations of offers, and can use action identifiers to obtain performance, generally as described above. The connecting circuitry can, for example, connect the processing circuitry to the Internet.

The system can also include memory circuitry storing instruction data defining instructions the processing circuitry can execute. The processing circuitry can execute search engine instructions to generate the combinations of offers and can execute transaction engine instructions to use the action identifiers to obtain performance.

Memory circuitry can also store a set of service combination data items, each indicating a combination of service identifiers that could be an instance of the combination of action types indicated by the combination data. The processing circuitry can update the set of service combination data items by associating action identifiers from offer signals with service identifiers. The processing circuitry can use the set of service combination data items in determining whether all service identifiers have associated action identifiers.

Memory circuitry can also store a set of trigger data items, each indicating an offer received in response to an inquiry. The processing circuitry can create a new service combination data item for a trigger data item, with the action identifier from the trigger data item associated with the service identifier indicated by the inquiry.

Memory circuitry can also store a set of invalid action data items. After using action identifiers to obtain performance, the processing circuitry can create an invalid action data item indicating each action identifier that was used. The processing circuitry can use the action identifier indicated by each invalid action data item to remove service combination data items having service identifiers associated with the same action identifier.

The technique can also be implemented in an article of manufacture with a storage medium and instruction data on the storage medium. The instruction data define a sequence of instructions that a processor can access using a storage medium access device. In executing the sequence of instructions, the processor can obtain combination data, can generate one or more combinations of offers, and can use action identifiers to obtain performance, generally as described above.

The new technique can also be implemented in a method that operates a first machine to transfer data to a second machine over a network, where the transferred data includes instruction data as described above.

In comparison with the technique described in the Andreoli et al. article, the new technique is advantageous because it can be used to pass information between search engine and transaction engine in a way that prevents bottlenecks. Actions, represented by their action identifiers, can be manipulated and passed around in various ways by simple interactions between search and transaction engines. Examples of manipulations include reserving, confirming, canceling, and checking of actions. As a result, search and transaction phases can continue in parallel with a pipeline of combinations passing between them.

The new technique is also advantageous because it can be implemented in a manner that permits interdependent search branches. For example, an offer received in response to an inquiry can then be used to provide a more fully specified inquiry, and so forth, which can target the search toward the parts of the search space that are consistent with existing offers and that are therefore most likely to contain available combinations of offers. In a simple example of trip planning, an offer of a room in a specific hotel can be used to provide an inquiry signal requesting offers of other services that are near the hotel, such as restaurants or car rentals.

The new technique is also advantageous because it can be extended to enable retroaction from transaction engine to search engine so that search trees can be pruned to enhance overall performance. Whenever, in the transaction phase, reservation of an action fails irretrievably, the search phase can use this information to cut branches of the search that depend on the action for which reservation failed. This is appropriate because any development of these branches would attempt the same failed reservation and would therefore inevitably fail.

The new technique is also advantageous because it can address two major sources of complexity for the coordination of software activities in an open world. One source of complexity is choices. In an open world, a service may be performed in different ways or at different conditions, from which a client must choose, possibly non-deterministically. The set of choices for a given service may never be closed, because new choices may arise dynamically due to changes in other parts of an application. Another source of complexity is conflicts. In an open world, resource conflicts among services executed concurrently may not be anticipated. To avoid inconsistencies in case of conflict, one of the conflicting services must abort in order to satisfy the other.

The new technique can be used to combine component software services, each of which is individually capable of generating choices for its service invocations and of dealing with conflicts in its service execution. The new technique can generate combinations of services, sometimes referred to as "coordination blocks", that exploit the choice and conflict management capabilities of the component services in order to achieve a coordinated behavior.

For example, the new technique can alleviate complexity resulting from choices by using search techniques that try all the combinations of choices generated without exclusion. Further, the technique can be applied when choices are interdependent, as in the case of a multi-party negotiation of services.

Similarly, the new technique can alleviate complexity resulting from conflicts by ensuring that, whenever an execution is aborted within a coordination block due to a conflict, the whole block is aborted. Further, the new technique can distinguish between temporary (soft) conflicts and permanent (hard) conflicts.

The following description, the drawings, and the claims further set forth these and other aspects, objects, features, and advantages of the invention.

DETAILED DESCRIPTION OF THE INVENTION

A. Conceptual Framework

Figure 1:
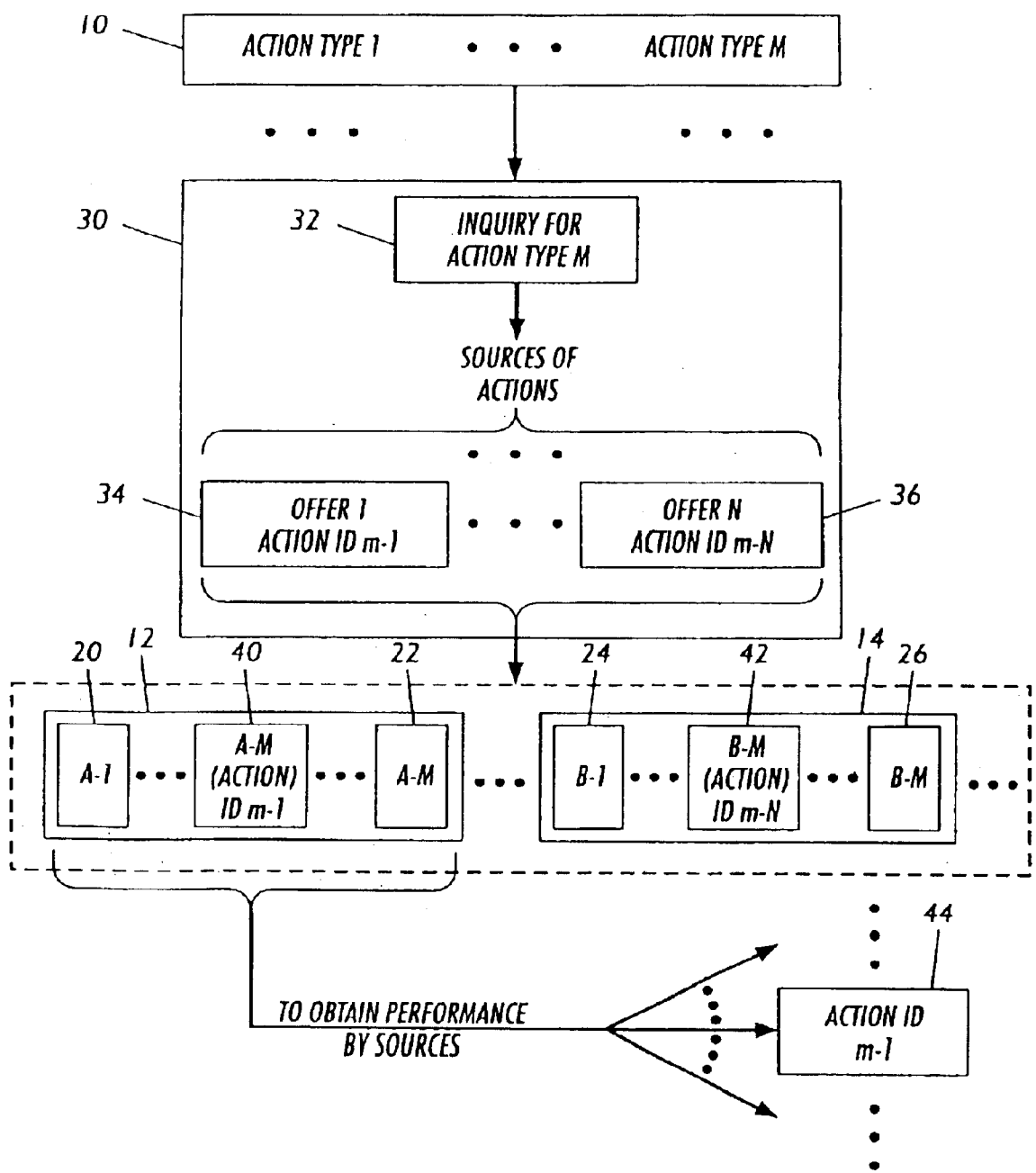
FIG. 1 is a schematic flow diagram showing how combinations of offers are generated and how action identifiers from the offers are used in obtaining performance of a combination of actions.

The following definitions are helpful in understanding the broad scope of the invention, and the terms defined below have the indicated meanings throughout this application, including the claims.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of diskettes storing a single body of data would together be a storage medium.

A "storage medium access device" is a device that includes circuitry that can access data on a data storage medium. Examples include drives for accessing magnetic and optical data storage media. "Memory circuitry" or "memory" is any circuitry that can store data, and may include local and remote memory and input/output devices. Examples include semiconductor ROMs, RAMs, and storage medium access devices with data storage media that they can access.

A "processor" or "processing circuitry" is a component of circuitry that responds to input signals by performing processing operations on data and by providing output signals. The input signals may, for example, include instructions, although not all processors receive instructions. The input signals to a processor may include input data for the processor's operations. The output signals similarly may include output data resulting from the processor's operations. A processor may include one or more central processing units or other processing components.

A processor or processing circuitry performs an operation or a function "automatically" when it performs the operation or function independent of concurrent human intervention or control.

Any two components are "connected" when there is a combination of circuitry that can transfer signals from one of the components to the other. For example, two components are "connected" by any combination of connections between them that permits transfer of signals from one of the components to the other.

A "network" is a combination of circuitry through which a connection for transfer of data can be established between machines. An operation "establishes a connection over" a network if the connection does not exist before the operation begins and the operation causes the connection to exist.

A processor or other component of circuitry "uses" an item of data in performing an operation when the result of the operation depends on the value of the item.

An "instruction" is an item of data that a processor can use to determine its own operation. A processor "executes" a set of instructions when it uses the instructions to determine its operations.

To "obtain" or "produce" an item of data is to perform any combination of operations that begins without the item of data and that results in the item of data. To obtain a first item of data "based on" a second item of data is to use the second item to obtain the first item.

An item of data "indicates" a thing, event, or characteristic when the item has a value that depends on the existence or occurrence of the thing, event, or characteristic can be obtained by operating on the item of data. An item of data "indicates" another value when the item's value is equal to or depends on the other value.

An "action" is anything that can be done, and a "source of actions" is any component that performs actions. In the specific case of coordination of sources that are components executing software, an action is the execution of a piece of software in one of the components, which is the source of the action.

An item of data "identifies" one of a set of items if the item of data has a value that is unique to the identified item. For example, an item of data identifies one of a set of actions or services if the item has a value that identifies only one action or service in the set.

A first item of data is "associated" with a second item of data when the first item can be accessed from the second. For example, the first item could be included within the second or could be stored in a related location in memory, or the second item of data could include a pointer or other item of data indicating the location of the first, or a third item of data such as a table could include an entry with pointers to both the first and second items.

An "action type" is a category that applies to actions. If each action is the execution of a piece of software, an action type could be a type of service or other function that is provided by executing some pieces of software.

A "combination of actions" results from combining two or more actions, such as by performing the actions concurrently, or in a certain sequence, or in any other coordinated manner. A "combination" of action types is a category that results from combining action types and therefore applies to combinations of actions. Action types could, for example, be logically combined by conjunctive or disjunctive operators to form a combination of action types.

Different communication protocols may use different names for the same type of communication, but many communication protocols include certain basic communication types and signal types. Within a given communication protocol, a communication "indicates" or "includes", in addition to what it explicitly indicates and includes, any information that is implicit in the communication in accordance with the protocol. For example, an "offer" is a communication from a source of actions indicating that the source would perform an action on condition. Depending on communication protocol, an offer may include information about the offered action or about conditions on which the action would be performed. Similarly, a "request" is a communication to a component indicating that a communication or action by the component is requested; a request may include information about the requested communication or action.

In general, information is "from" a communication if the communication indicates or includes the information, either explicitly or implicitly as a result of the communication protocol. An action identifier would, for example, be from an offer if the offer indicated the action identifier.

As used herein, an "inquiry" is a request for offers. An inquiry could, for example, request offers to perform actions of an indicated type and could request that each offer indicate an action identifier identifying the offered action.

A "combination of offers" results from combining two or more offers. An operation "generates" a combination of offers if it uses information about the offers and produces information about their combination.

An operation "obtains performance" of an action or of a combination of actions if the operation provides communications that result in performance of the action or combination of actions.

The terms "server" and "client" are related types of machines: A "server" performs services in response to requests from a "client".

A "variable" is an item of information that can be used in performing a service or other operation and that can have one of a number of values. A variable is "specified" or "instantiated" when one of its values has been identified.

B. General Features

Figure 2:
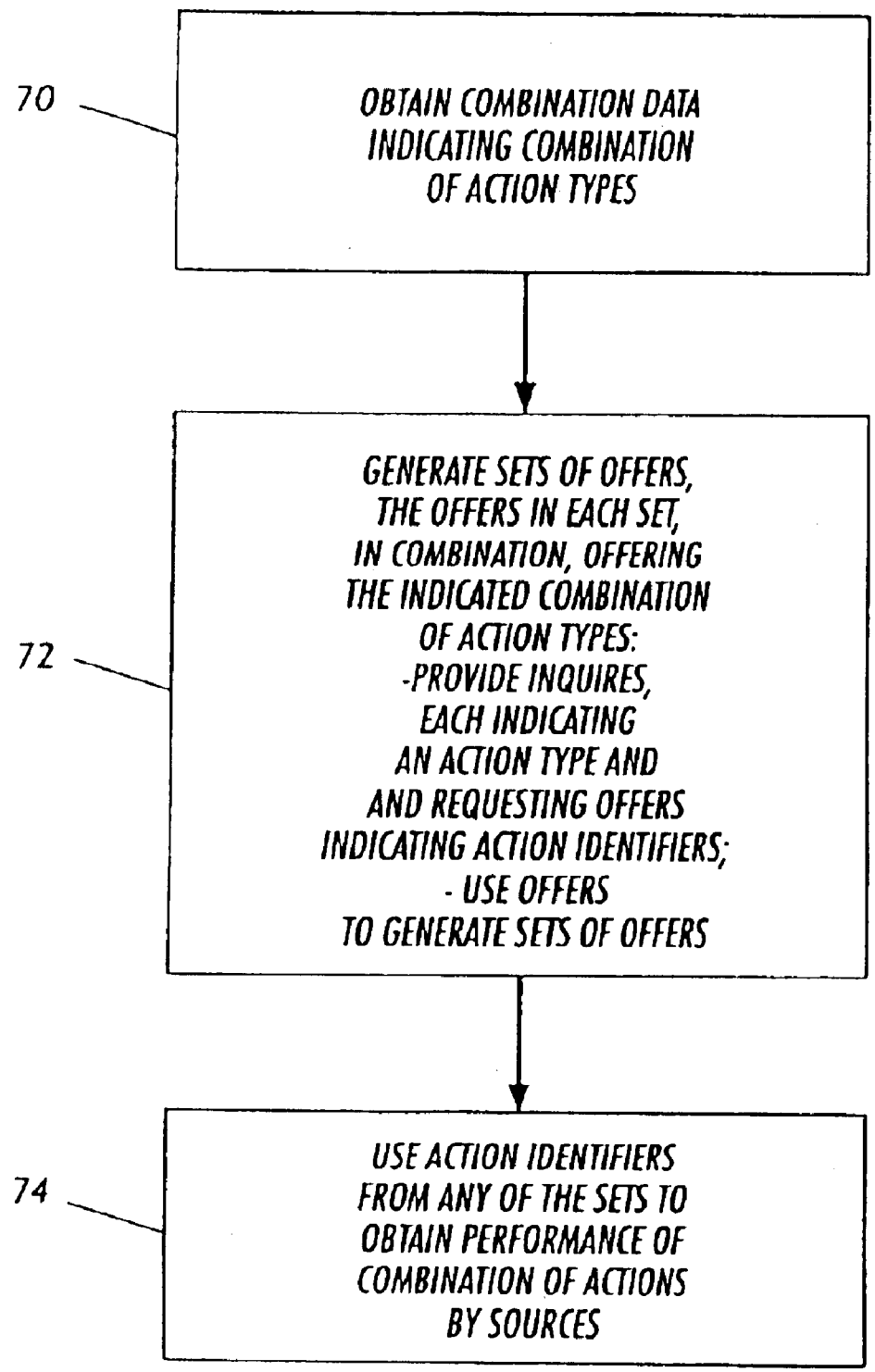
FIG. 2 is a flow chart showing general acts in a technique that generates combinations of offers and uses action identifiers from the offers to obtain performance of a combination of actions.
Figure 3:
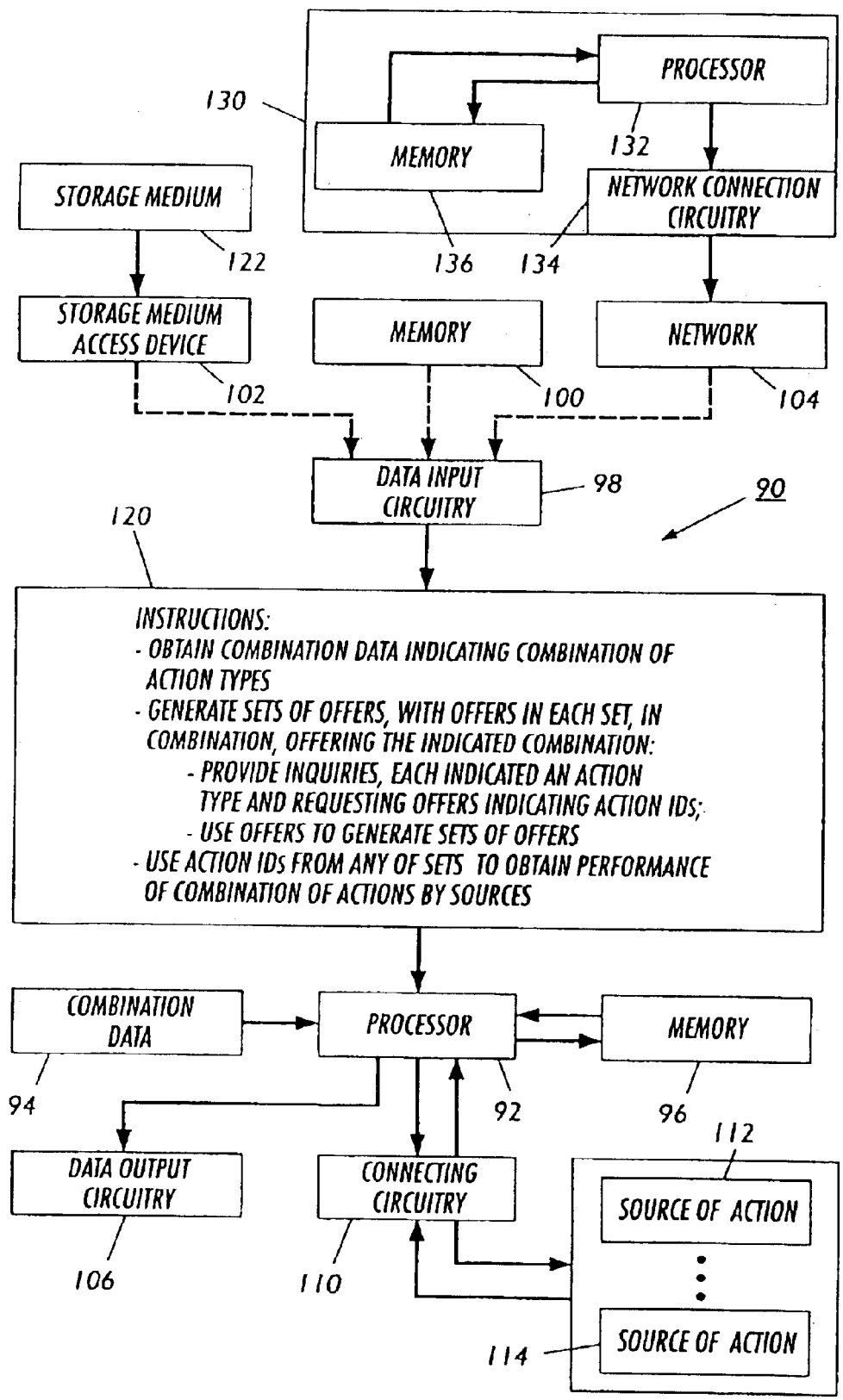
FIG. 3 is a schematic block diagram of a system in which the technique of FIG. 2 can be implemented.

FIGS. 1–3 illustrate general features of the invention.

In FIG. 1, combination data 10 indicate a combination of action types 1 through M, where M is two or more. The combination could, for example, be a conjunction of action types.

One or more combinations of offers are, generated, as illustrated by representative combinations 12 and 14. The offers in each combination together offer the combination of action types indicated by combination data 10. For illustrative purposes, each combination is shown as including a number of elements. As illustrated, combination 12 includes elements 20 through 22, designated A-1 through A-M, while combination 14 includes elements 24 through 26, designated B-1 through B-M.

In generating combinations of offers, inquiries are provided to sources of actions, requesting offers, as illustrated in box 30. Inquiry 32 indicates type m, one of the M action types from combination data 10. Inquiry 32 also requests offers that offer to perform actions of type m and that each indicate an action identifier identifying the offered action.

In general, zero or more offers could be received from sources of actions in response to each inquiry. In the illustrated example, at least N offers 34, 36, etc., are received in response to inquiry 32. The first, offer 34, indicates an action identifier (ID) designated m-1, while the Nth, offer 36, indicates an action ID designated m-N.

The dashed circles around offers 34, 36, etc. and around combinations of offers 12, 14, etc. illustrate that the operations of providing inquiries, receiving offers, and generating combinations of offers can, in general, be performed asynchronously and, in some cases, in parallel. For example, a subsequent inquiry could be provided while offers are being received in response to inquiry 32. Similarly, combinations of offers 12 and 14 can be generated even though additional offers may be received in response to inquiry 32 and other inquiries.

Offers 34, 36, etc. are used to generate combinations of offers 12, 14, etc. as illustrated by element 40, designated A-m and representing offer 34, and element 42, designated B-m and representing offer 36. In generating combination 12, for example, action ID m-1 from offer 34 is used in relation to offer 40. Similarly, in generating combination 14, action ID m-N from offer 36 is used in relation to element 42.

Action IDs from offers in any of the generated combinations, illustratively in combination 12, are used to obtain performance of a combination of actions by sources of actions. In the illustrated example, action ID m-1 from element 40 is one of the action IDs used to obtain performance.

FIG. 2 illustrates general acts in generating combinations of offers that include action identifiers and in using action identifiers to obtain performance of a combination of actions. The act in box 70 obtains combination data indicating a combination of action types. The act in box 72 generates one or more combinations of offers, with the offers in each combination together offering the combination of action types indicated by the combination data.

The act in box 72 includes providing inquiries to sources of actions. Each inquiry indicates at least one of the action types in the combination. Each inquiry also requests offers that offer to perform actions of the indicated type and that each indicate an action identifier identifying the offered action.

The act in box 72 also includes using offers that are received in response to the inquiries to generate the combinations of offers.

The act in box 74 uses action identifiers from the offers in any of the generated combinations to obtain performance of a combination of actions by the sources.

System 90 in FIG. 3 includes processor 92 connected for obtaining combination data 94 indicating a combination of two or more action types and also connected for accessing data in memory 96. Processor 92 is also connected for receiving data through data input circuitry 98, which can illustratively provide data received from connections to memory 100, storage medium access device 102, or network 104. Processor 92 is also connected for providing data through data output circuitry 106, which could provide data through connections to components similar to those from which data input circuitry 98 can receive data. Connecting circuitry 110 connects processor 92 to sources of actions 112 through 114. Although shown separately, connecting circuitry 110 could, for example, be implemented as connections to network 104. Processor 92 therefore could be the central processing unit (CPU) of a personal computer, workstation, or server, or any other processing device capable of operating as described below.

Combination data 94 could be obtained from any appropriate source, including user input circuitry (not shown), memory 96, or data input circuitry 98. If processor 92 is a server, for example, combination data 94 could be received from a client machine through network 104.

Instruction data 120 illustratively provided by data input circuitry 98 indicate instructions that processor 92 can execute. In executing the instructions indicated by instruction data 120, processor 92 obtains combination data 94 and generates combinations of offers, with the offers in each combination together offering the combination of action types indicated by combination data 94.

In generating combinations of offers, processor 92 provides inquiries to sources of actions 112 through 114 through connecting circuitry 110. Each inquiry indicates at least one of the action types in the combination. Each inquiry also requests offers that offer to perform actions of the indicated type and that each indicate an action identifier identifying the offered action. Processor 92 also uses offers received through connecting circuitry 110 in generating the combinations of offers.

In executing the instructions, processor 92 also uses action identifiers from the offers in any of the generated combinations in obtaining performance of a combination of actions by sources of actions 112 through 114.

As noted above, FIG. 3 illustrates three possible sources from which data input circuitry 98 could provide data to processor 92—memory 100, storage medium access device 102, and network 104.

Memory 100 could be any conventional memory within system 90, including random access memory (RAM) or read-only memory (ROM), or could be a peripheral or remote memory device of any kind.

Storage medium access device 102 could be a drive or other appropriate device or circuitry for accessing storage medium 122, which could, for example, be a magnetic medium such as a set of one or more tapes, diskettes, or floppy disks; an optical medium such as a set of one or more CD-ROMs; or any other appropriate medium for storing data. Storage medium 122 could be a part of system 90, a part of a server or other peripheral or remote memory device, or a software product. In each of these cases, storage medium 122 is an article of manufacture that can be used in a machine or system.

Network 104 can provide data from machine 130. Processor 132 in machine 130 can establish a connection with processor 92 over network 104 through network connection circuitry 134 and data input circuitry 98. Either processor could initiate the connection, and the connection could be established by any appropriate protocol. Then processor 132 can access instruction data stored in memory 136 and transfer the instruction data to processor 92 over network 104. Processor 92 can store the instruction data in memory 96 or elsewhere, and can then execute the instructions as described above.

C. Implementation

The general features described above could be implemented in numerous ways on various machines to obtain performance of combinations of actions. An implementation described below has been implemented on a system with several kinds of workstations running various operating systems, including Microsoft NT and Unix, and executing code compiled mainly from Python and Java.

C.1. Overview

Figure 4:
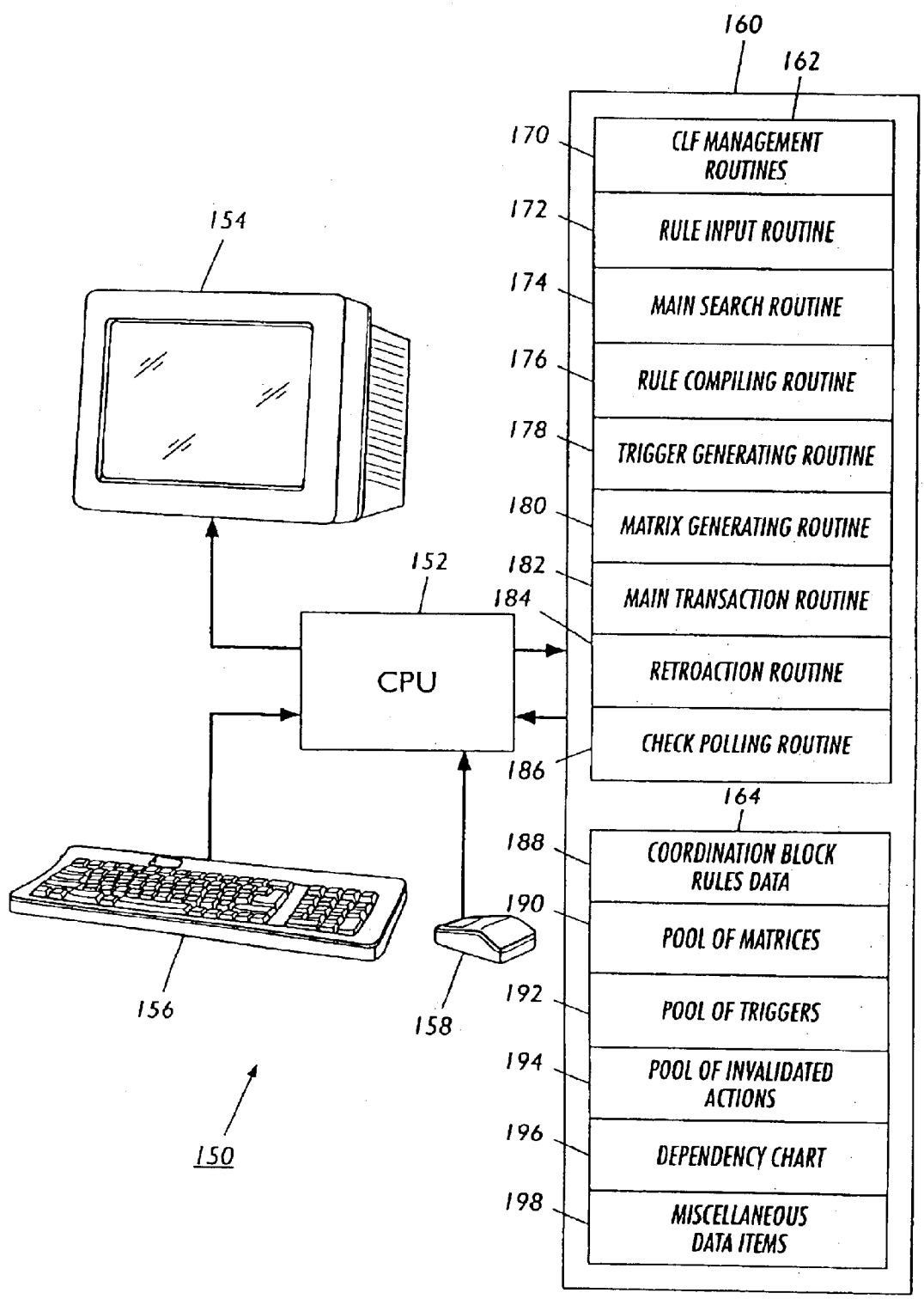
FIG. 4 is a schematic diagram of a system in which the general acts in FIG. 2 have been implemented.

In FIG. 4, system 150 includes the central processing unit (CPU) 152 of a workstation, which is connected to display 154 for presenting images and to keyboard 156 and mouse 158 for providing signals from a user. CPU 152 is also connected so that it can access memory 160, which can illustratively include program memory 162 and data memory 164.

The routines stored in program memory 162 can be grouped as illustrated. Coordination Language Facility (CLF) management routines 170 provide a user interface and an environment in which the other illustrated routines can run. Many features of CLF management routines 170 can be understood from Andreoli, J.-M., Pacull, F., Pagani, D., and Pareschi, R., "Multiparty Negotiation of Dynamic Distributed Object Services", *Journal of Science of Computer Programming*, Vol. 31, 1998, pp. 179–203, discussed above and incorporated herein by reference. In FIG. 2, Andreoli et al. show general features of a CLF paradigm, and in section 2.3, Andreoli et al. describe features of CLF that are generally applicable to the implementation described below, except as otherwise noted.

As described in Andreoli et al., CLF can be implemented using object-oriented programming techniques. CLF management routines 170 and the other routines and items of data shown in FIG. 4 have been implemented using the Python programming language. CLF management routines 170 may define a protocol that runs on top of various other existing protocols, including, for example, an application level such as RPC, WebDav, Hypertext Transfer Protocol (HTTP), TCP/IP, Jini, Java Remote Method Invocation (RMI), and so forth.

Rule input routine 172 provides combination data, referred to by Andreoli et al. as "rules". The act in box 172 thus implements the act in box 70 in FIG. 2. The rules themselves could be obtained in a wide variety of ways, such as through a user interface provided by CLF management routines 170 enabling a user to interactively input rules using keyboard 156, mouse 158, and display 154. In the current implementation, rules can be dynamically created by software components and stored in CLF objects on servers, so that they can be manipulated by other rules.

The other routines illustrated in FIG. 4 include routines that implement a search engine and a transaction engine as described by Andreoli et al. in section 2.3.3, and could be implemented to perform search and transaction operations automatically. Main search routine 174 implements part of the search engine, but can call rule compiling routine 176, which is independent of the search and transaction engines. Trigger generating routine 178 and matrix generating routine 180 also implement parts of the search engine. Main transaction routine 182 implements the transaction engine. Retroaction routine 184 provides feedback from the transaction engine to the search engine, and check polling routine 186 supports the transaction engine by increasing efficiency of feedback provided by retroaction routine 184. In general, the search engine routines implement the act in box 72 in FIG. 2, while the transaction engine routines implement the act in box 74.

Together, rule input routine 172, the search engine routines, and the transaction engine routines implement instruction data 120 in FIG. 3.

In executing routines in program memory 162, CPU 152 can access several items of data stored in data memory 164—coordination block rule data 188, pool of matrices 190, pool of triggers 192, pool of invalidated actions 194, dependency chart 196, and miscellaneous data items 198.

Figure 5:
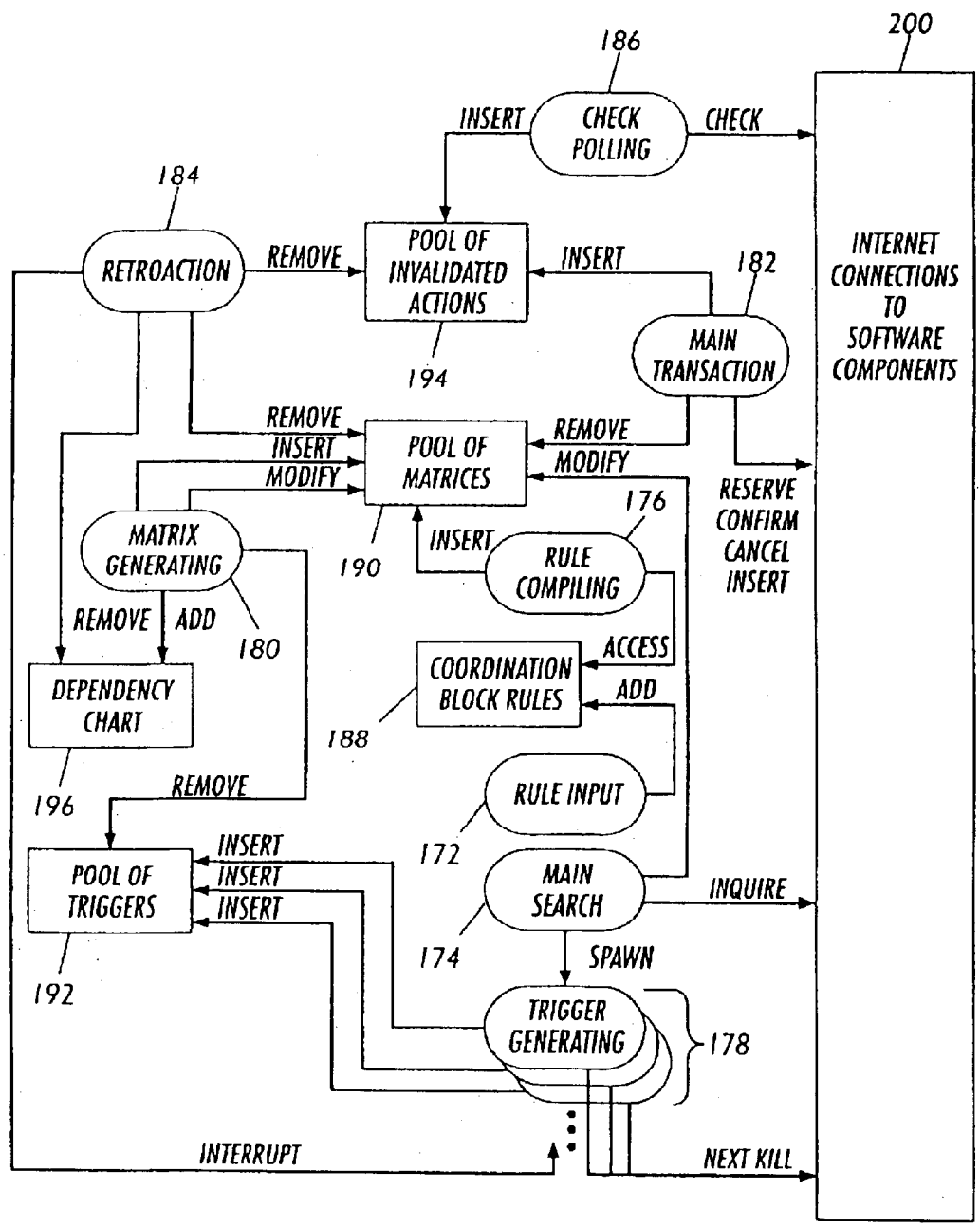
FIG. 5 is a schematic diagram showing relations between components in the system of FIG. 4.

FIG. 5 shows some relationships between routines in program memory 162 and items of data in data memory 134. In general, items of data are shown as rectangular and threads executing routines are shown as rounded, and all have the same reference numbers as in FIG. 4. As suggested in FIG. 5, the threads can operate continuously, except that certain threads call, spawn, or interrupt instances of other threads. Within each of the pools, items of data can have any order and are not explicitly linked.

Rule input thread 172 can add items of data indicating rules to coordination block rules 188. Each item of data defining one of the rules in a coordination block can take the form described by Andreoli et al., with left and right sides, and with each side including a list of tokens that are conjoined. Each token can identify a service available from a server and one or more variables applicable to the service. In the following discussion, service identifiers are represented by lower case letters such as p, q, r, etc. which have scope over a set of rules, identifying the same service in each rule in which they appear, while variables are represented by upper case letters such as X, Y, etc. which have scope only within a rule and therefore could identify different variables in each rule. Within each list, tokens are separated by the character "@" and the two lists are separated by the character sequence "<>–". An example of an expression representing a rule is thus:

p(X)@q(X, Y)<>–r(Y)

Coordination block rules 188 can also include items of data referred to as "signatures" that indicate search phase relations between elements of tokens on the left side of rules. For example, a signature for the first token of the above rule could indicate that the service identified by p does not have any input variables and has only the output variable X; similarly, a signature for the second token could indicate that the service identified by q has X as an input variable and Y as an output variable. These signatures might be represented thus:

p(X): →X q(X, Y): X→Y

In general, the signatures should ensure that at any time at least one of the unassigned tokens in a matrix has all its input variables instantiated. Specifically, the signature of at least one token should not have an input variable, each input variable should also appear as an output variable of another token, and there should not be any cycles formed by input and output variables. These requirements can be satisfied by appropriate syntactic restrictions on the rules and signatures.

As will become clear from the description below, the implementation can find values for the variables and identifiers for actions (action IDs). As a result, p(x) could specify an offer to perform service p with the variable value x and with an action ID such as a, while q(x, y) could specify an offer to perform service q with the variable values x and y and with an action ID such as b, and r(y) could specify a request to make an offer available to perform service r with the variable value y.

During search, operations are performed to generate sets of offers that satisfy the left side of a rule, using action IDs as discussed in greater detail below. During transaction, action IDs are used to obtain performance of a set of offers and, if performance is obtained, a notification for a service to make available an offer with variables as specified in the right side of the rule is made.

Rule compiling thread 176 can access each rule's item of data in coordination block rules data 188, use it to produce a matrix data item for the rule, and insert the rule's matrix into pool of matrices 190. Initially, each matrix data item can include data indicating the rule and that the matrix status is open. Each matrix data item can also include fields in which other information relating to search can be stored as it is obtained, as described below. The matrix data item can, for example, include a partial instantiation of the rule's variables with values, a partial assignment of action IDs to the rule's left side tokens, an indication of a token for which an inquiry signal has been sent, a handle for a stream of offer signals to an inquiry signal, and a list of identifiers of offspring matrix data items.

A matrix data item designated M1, when initially created, could thus include the following items:

Rule: p(X)@q(X, Y)<>–r(Y)

Status: Open

Variable instantiation: None

Token assignment: None

Distinguished token: None

Stream handle: None

Offspring: None

Main search thread 174, described in greater detail below, can modify matrices in pool 190, provide Inquire signals to software components through Internet connections 200, and spawn trigger generating threads 178. Each trigger generating thread 178 can respond to offer signals received in response to one of the Inquire signals, providing a Next signal through Internet connections 200 to obtain the next offer signal in the stream and inserting a trigger data item into pool of triggers 192 based on each offer signal, as described in greater detail below. Each trigger generating thread 178 can also destroy the stream of offer signals in response to the inquire signal by providing a Kill signal through Internet connections 200.

Matrix generating thread 180, also described in greater detail below, can use information from a trigger in pool 192 to insert another matrix into pool of matrices 190, and can remove the trigger from pool 192. In addition to inserting the matrix into pool 190, matrix generating thread 180 can also modify a parent matrix and add an entry for the new matrix in dependency chart 196.

As described in greater detail below, main transaction thread 182 can use information from a closed matrix in pool 190 to provide a Reserve signal through Internet connections 200 for the action ID assigned to each left side token of the matrix' rule, and can remove the matrix from pool 190. Main transaction thread 182 can also provide Confirm signals and Insert signals through Internet connections 200 if all actions are successfully reserved, and can provide Cancel signals through Internet connections 200 if not. When appropriate, main transaction thread 182 can insert action data items into pool of invalidated actions 194.

Retroaction thread 184 can use an action data item from pool 194 to remove entries from dependency chart 196 and to remove matrices from pool 190, and can remove the action data item from pool 194, as described in greater detail below. Retroaction thread 184 can also interrupt trigger generating threads 178.

Check polling thread 186 can periodically provide a Check signal through Internet connections 200 and, when appropriate, can insert an action data item into pool 194, as described in greater detail below.

Figure 6:
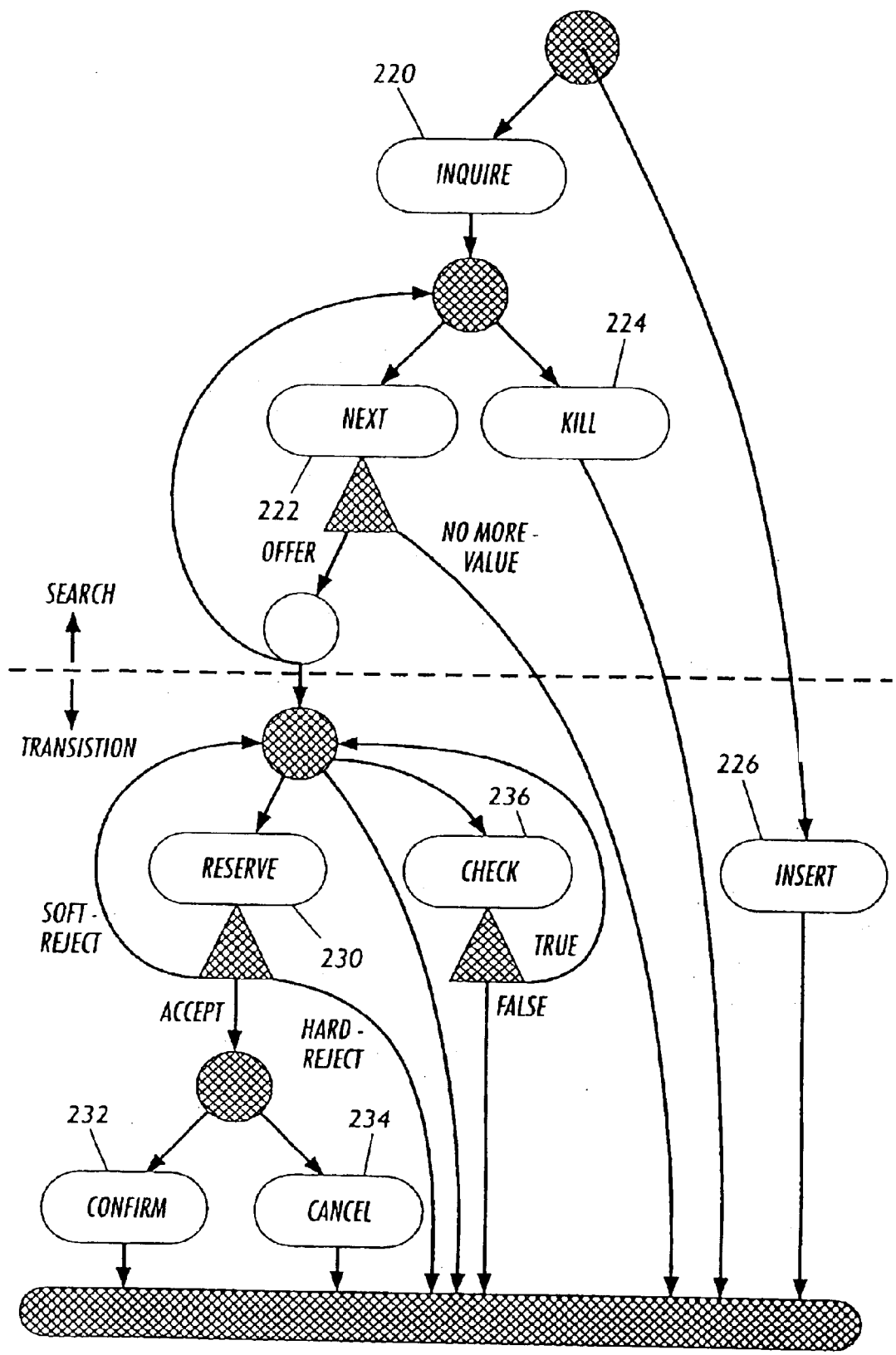
FIG. 6 is a schematic diagram showing phases in a sequence of operations performed by a server in response to signals from components in FIG. 5.

The signals provided to Internet connections 200 invoke server operations similar to signals described in the Andreoli et al. article. The allowed sequence of invocation of operations is illustrated in FIG. 6, which is similar to FIG. 4 of the Andreoli et al. article.

The invocation of a service by a client goes through phases that are illustrated as rounded shapes containing phase names in FIG. 6, and can be implemented on the server as described in greater detail below. In FIG. 6, the small shaded circles indicate alternative branches for which the client can determine to follow no more than one branch. In contrast, the small open circle indicates a fork for which the client can determine to follow both branches. The small shaded triangles indicate alternative branches for which the server can determine to follow no more than one branch. The long shaded shape at the bottom of FIG. 6 represents the end of the sequence.

The Inquire, Next, Kill, and Insert signals may be thought of as requesting choice management phases, while the Reserve, Confirm, Cancel, and Check signals request conflict management phases.

In the description below, it is assumed that the requested service is implicitly identified by the network address to which signals are sent.

In Inquire phase 220, a server receives an Inquire signal with values for zero or more input parameters, which can be referred to as "input-parameters-tuple" and which can partially specify a service being requested. In response, the server provides a handle for a stream of offer signals it will provide, each offering a service that meets the partial specification. The handle can be referred to simply as "stream-handle".

In Next phase 222, the server receives a Next signal with stream-handle and either returns the next offer on the stream or, if no further offer will ever arise in the stream, a special value, which can be referred to as "NO-MORE-VALUE". Each offer can include an action ID for an offered service and values for zero or more output parameters, which can be referred to as "output-parameters-tuple" and which complete the specification of the offered service.

In Kill phase 224, the server receives a Kill signal with stream-handle and destroys the stream. The Kill signal indicates that the client will not provide further Next signals with stream-handle, so that there is no longer any need to keep the stream open. The server need not return any value in response to the Kill signal.

In Insert phase 226, the server receives an Insert signal with a set of parameter values sufficient to specify a service that the server can later propose to perform. The parameter values can be referred to as "parameters-tuple". The Insert signal is a request to add a service offer as specified, and the server need not return any value in response.

In Reserve phase 230, the server receives a Reserve signal with an action ID that the server earlier provided in response to a Next signal. The server can return one of the following values, to indicate whether the action identified by the action ID is available: HARD-REJECT, indicating the action is not, and never again will be, available because it conflicts with another action that has already been committed; SOFT-REJECT, indicating that the action is not now, but may in the future again become, available because it conflicts with another action that has been reserved but not yet committed; and ACCEPT, indicating that the action does not conflict with any other action and that the server will reserve the action and not reserve or commit any conflicting action until the client confirms or cancels the reserved action.

In Confirm phase 232, the server receives a Confirm signal with an action ID that has been previously reserved and, in response, performs or commits the action identified by the action ID. The server need not return any value.

In Cancel phase 234, the server receives a Cancel signal with an action ID that has been previously reserved and, in response, aborts the action identified by the action ID by not performing it and by removing the reservation on it. The server need not return any value. The server could be implemented to determine in this phase whether the action ID should remain assigned to the same action or should be made available for assignment to another action.

In Check phase 236, the server receives a Check signal with an action ID that it provided in response to a Next signal. The server returns the value TRUE if the action does not conflict with another action that has been committed, and otherwise returns FALSE, so that FALSE means the server would return HARD-REJECT in response to any later Reserve signal with the action ID.

It would be straightforward to implement servers that satisfy FIG. 6 and the above description, but it is not realistic to expect that all servers will be specially implemented in accordance with FIG. 6. Therefore, an equivalent result can be obtained by using conventional wrapper techniques to provide, for each type of server being used, wrapper code that runs on the server and that provides an appropriate interface to the existing server code while at the same time providing an interface to the threads in FIG. 5 that conforms with FIG. 6.

In addition, the implementation assumes that component software services being coordinated are (i) available under a uniform component model and (ii) capable individually of dealing with choices and conflicts.

Assumption (i) simply means that access to a component is done through an interface defining the public services offered by that component, clearly separated from the implementation of the services. This alleviates the issue of heterogeneity that can arise in complex applications that integrate components implemented in different object oriented languages or even components not designed in an object-oriented way. The Common Object Request Broker Architecture proposed by the Object Management Group is a good example of a uniform component model.

Assumption (ii) means that the communication protocol with the components makes it possible to deal with choices and conflicts in service invocations. As will become more apparent below, each server must decide, when two reservations are attempted on conflicting actions, which one to reject and how. Various strategies have been explored in the literature. A dumb strategy would be to systematically soft reject the reservation that comes last—this is very easy to implement but may force interdependent transactions to be aborted and later unsuccessfully retried a number of times. More, intelligent strategies assume that, for each reservation, a client passes information about a context of the transaction in which the reservation occurs. In some such strategies, a transaction identifier is passed and reservations attempted by transactions with lower identifier values are soft rejected while others are kept waiting. To implement such a strategy, a new unique identifier, possibly giving access to some transaction context, could be created for each new transaction and could be passed with all the transactional operations of the protocol.

C.2. Search Engine Operations

Figure 7:
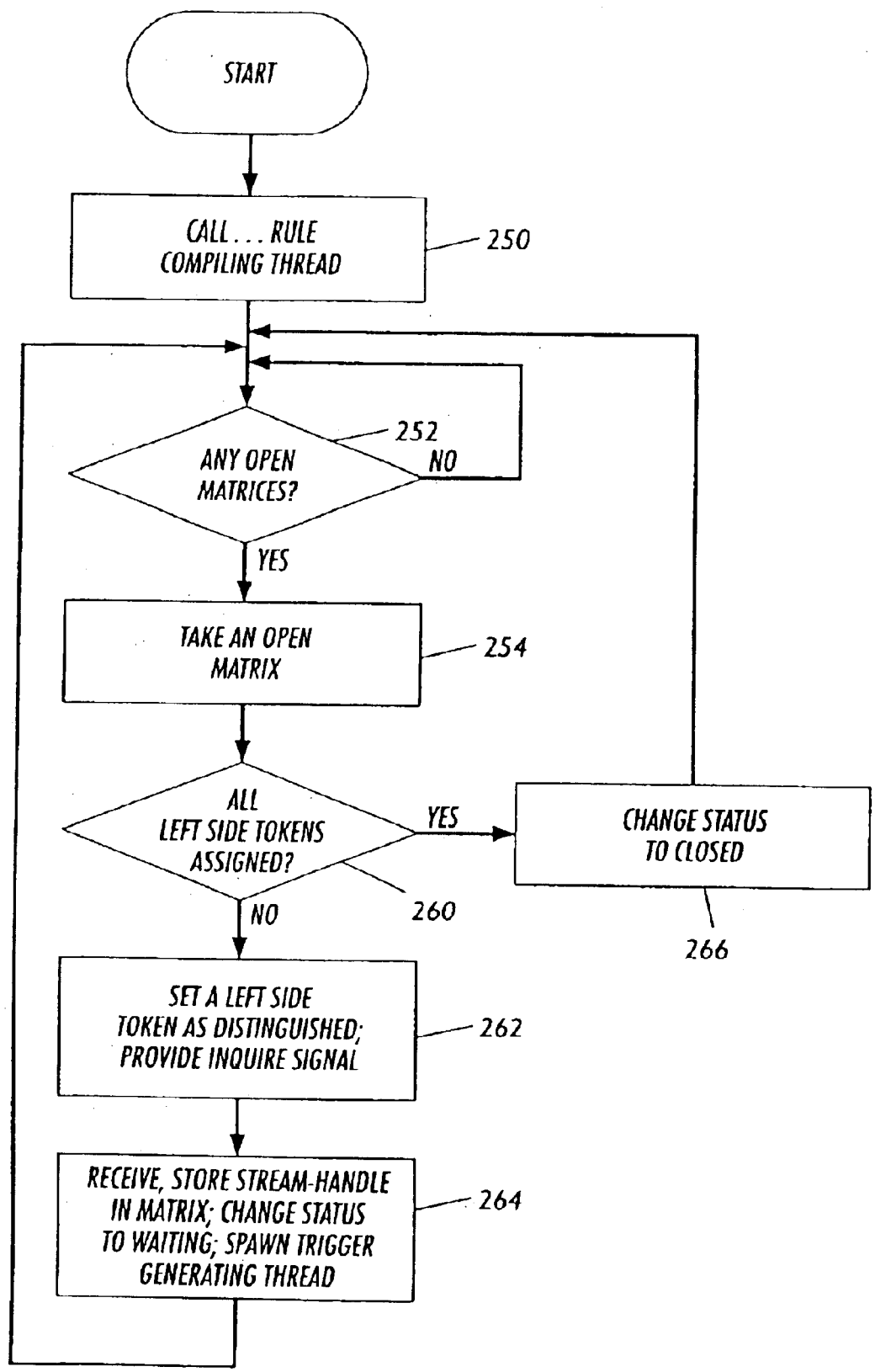
FIG. 7 is a flow chart showing acts that can be performed by a main search thread in FIG. 5.

FIG. 7 shows one way main search thread 174 in FIG. 5 can be implemented.

The act in box 250 prepares for search by calling rule compiling thread 176, which in effect initializes pool of matrices 190. The act in box 250 can perform other initialization, and can also start other search engine threads such as matrix generating thread 180 and even transaction engine threads such as main transaction thread 182, retro-action thread 184, and check polling thread 186.

The act in box 252 provides two loops—a wait loop that is performed repeatedly whenever there are no open matrices in pool 190, and an iterative loop that handles the open matrices in pool 190 whenever any open matrices are present. The iterative loop begins in box 254 by taking one of the open matrices for handling.

The act in box 260 branches based on whether, in the matrix from box 254, all left side tokens have associated action IDs, or are "assigned". If not, the matrix does not yet represent the combination indicated by the left side of its rule, and further search is required.

The act in box 262 selects one of the matrix' left side tokens whose input variables, if any, are all instantiated, sets the token as distinguished, and provides an Inquire signal to the server that provides the service indicated in the token. The act in box 264 receives a stream-handle from the server and stores it in the matrix, also changing the status of the matrix to "waiting" and spawning trigger generating thread 178 for the stream-handle. Then the main search thread returns to the test in box 252 for the next iteration.

After the first iteration of the act in box 264, matrix M1 above could be changed to M1' as follows:

Rule: p(X)@q(X, Y)<>-r(Y)
Status: Waiting
Variable instantiation: None
Token assignment: None
Distinguished token: 1
Stream handle: J321456
Offspring: None Note that the tokens can be identified by their position from the left in the left side of the rule, with "1" representing the leftmost, i.e. p(X), and so forth. The handle and also action IDs can be uninterpreted strings that are only meaningful to the server that provides them. Variable instantiations can also be simple uninterpreted strings.

When all the left side tokens of a matrix' rule have been assigned and therefore have associated action IDs, the act in box 266 changes the status of the matrix to closed, and the matrix is then ready for the transaction engine, as discussed in greater detail below.

Figure 8:
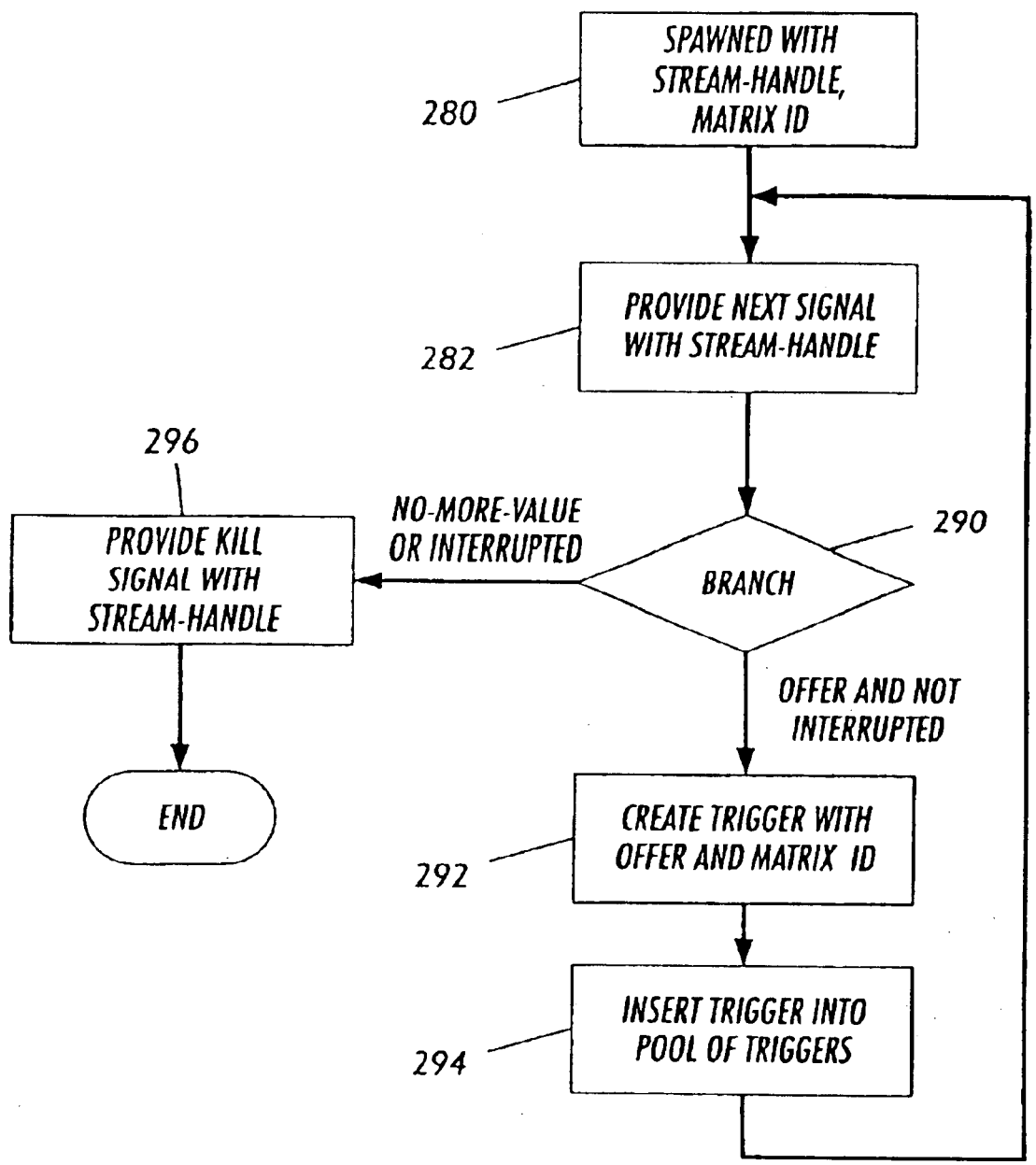
FIG. 8 is a flow chart showing acts that can be performed by a trigger generating thread in FIG. 5.

FIG. 8 shows one way trigger generating thread 178 in FIG. 5 can be implemented.

The act in box 280 begins as the thread is spawned with the stream-handle from box 264 in FIG. 7 and with a matrix ID identifying the matrix that was being handled when the stream-handle was received. The thread then begins a series of iterations, each of which begins by providing, in box 282, a Next signal with the stream-handle to the server that provided the stream-handle.

Spawning trigger generating thread 178 rather than including it in main search thread 174 prevents blockage of the search engine to wait for new elements to be received, because the elements of the stream appear asynchronously. Also, the enumerated stream may be unbounded, so that the enumeration loop could last forever.

The act in box 290 branches based in part on the server's response to the Next signal, which will either be an offer or NO-MORE-VALUE and based in part on whether an interrupt has been received. If an interrupt has not been received and the server provides an offer rather than NO-MORE-VALUE, the act in box 292 creates a trigger data item. The trigger data item includes the data from the offer provided by the server and also includes the matrix ID from box 280. The act in box 294 inserts the trigger data item from box 292 into pool of triggers 192.

If an interrupt has been received or if NO-MORE-VALUE is received from the server, the thread provides a Kill signal with the stream-handle to the server, in box 296, and then ends.

Figure 9:
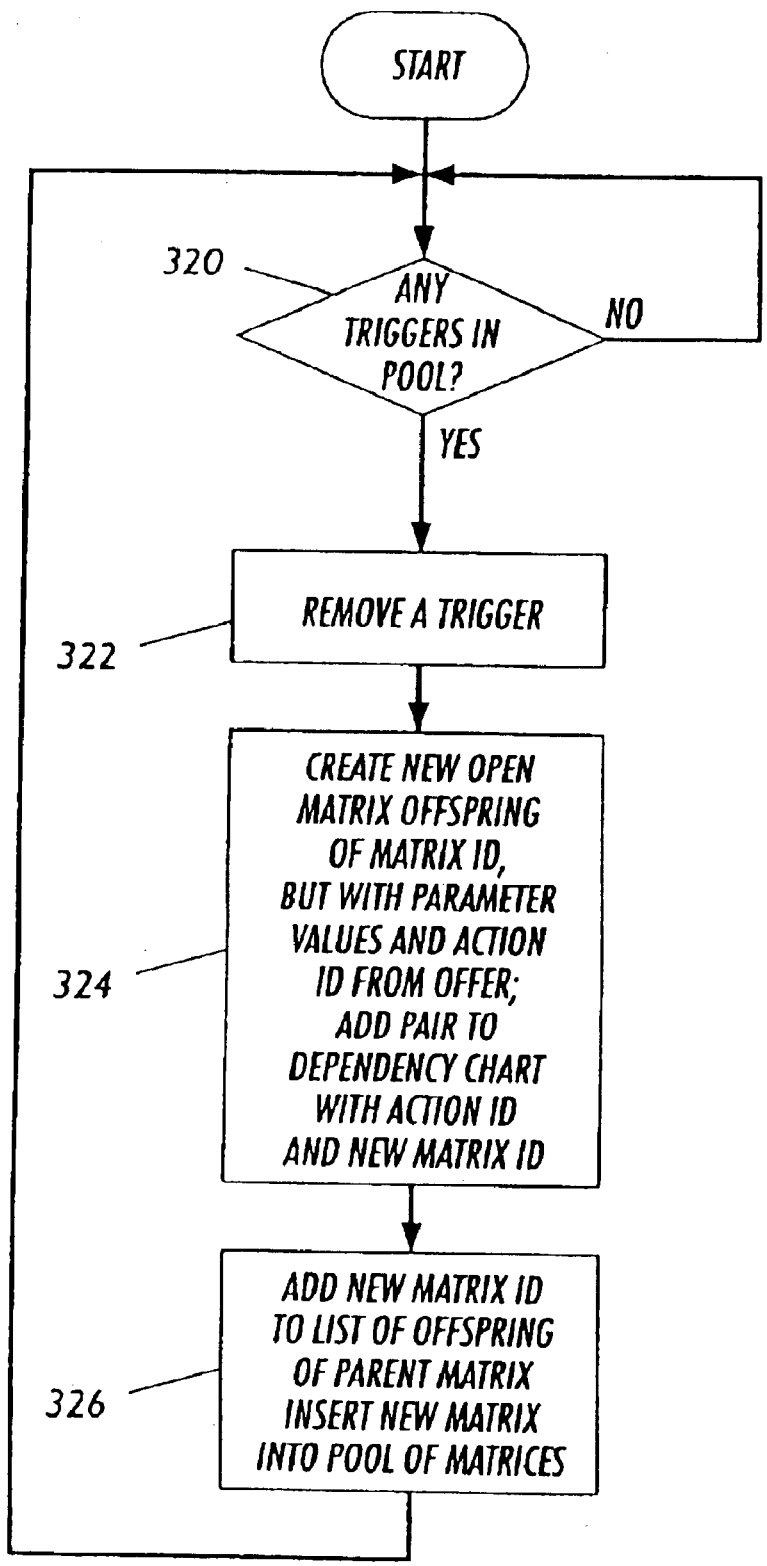
FIG. 9 is a flow chart showing acts that can be performed by a matrix generating thread in FIG. 5.

FIG. 9 shows one way matrix generating thread 180 in FIG. 5 can be implemented.

The act in box 320 provides two loops—a wait loop that is performed repeatedly whenever there are no triggers in pool 192, and an iterative loop that handles the triggers in pool 192 whenever any triggers are present. The iterative loop begins in box 322 by removing one of the triggers for handling. The act in box 322 can also test whether a removed trigger includes a matrix ID of a matrix that is no longer in pool of matrices 190 and, if so, ignore the trigger by removing another trigger for handling.

The act in box 324 uses information from the trigger removed in box 322 to create a new open matrix that is an offspring of the matrix identified by the matrix ID ("the parent matrix") in the trigger and that has parameter values from the offer in the trigger. In the new matrix, the token that is distinguished in the parent matrix is associated with the action ID from the offer in the trigger. The act in box 324 also adds a pair to dependency chart 196 with the action ID from the offer in the trigger and an identifier of the new matrix, the new matrix ID.

After the act in box 324, a new matrix M2 obtained from matrix M1' above could be as follows:

Rule: p(X)@q(X, Y)<>-r(Y)
Status: Open
Variable instantiation: {X: "foo"}
Token assignment: {1: "A621534"}
Distinguished token: None
Stream handle: None
Offspring: None, where variable instantiation "foo" and action ID "A621534" were uninterpreted strings included in the offer in the trigger. In other words, the, variable instantiation of the parent matrix has been augmented with instantiation of the parameters of the distinguished token of the parent matrix, and the assignment of tokens of the parent matrix has been augmented with an additional assignment of the action ID from the offer to the distinguished token of the parent matrix.

The act in box 326 modifies the parent matrix by adding the new matrix ID to the list of offspring. The act in box 326 also inserts the new matrix into the pool of matrices.

After the act in box 326, matrix M1' above could be changed to M1" as follows:

Rule: p(X)@q(X, Y) <>-r(Y)
Status: Waiting
Variable instantiation: None
Token assignment: None
Distinguished token: 1
Stream handle: J321456
Offspring: M2

The thread then returns to box 320 to begin the next iteration.

C.3. Transaction Engine Operations

Figure 10:
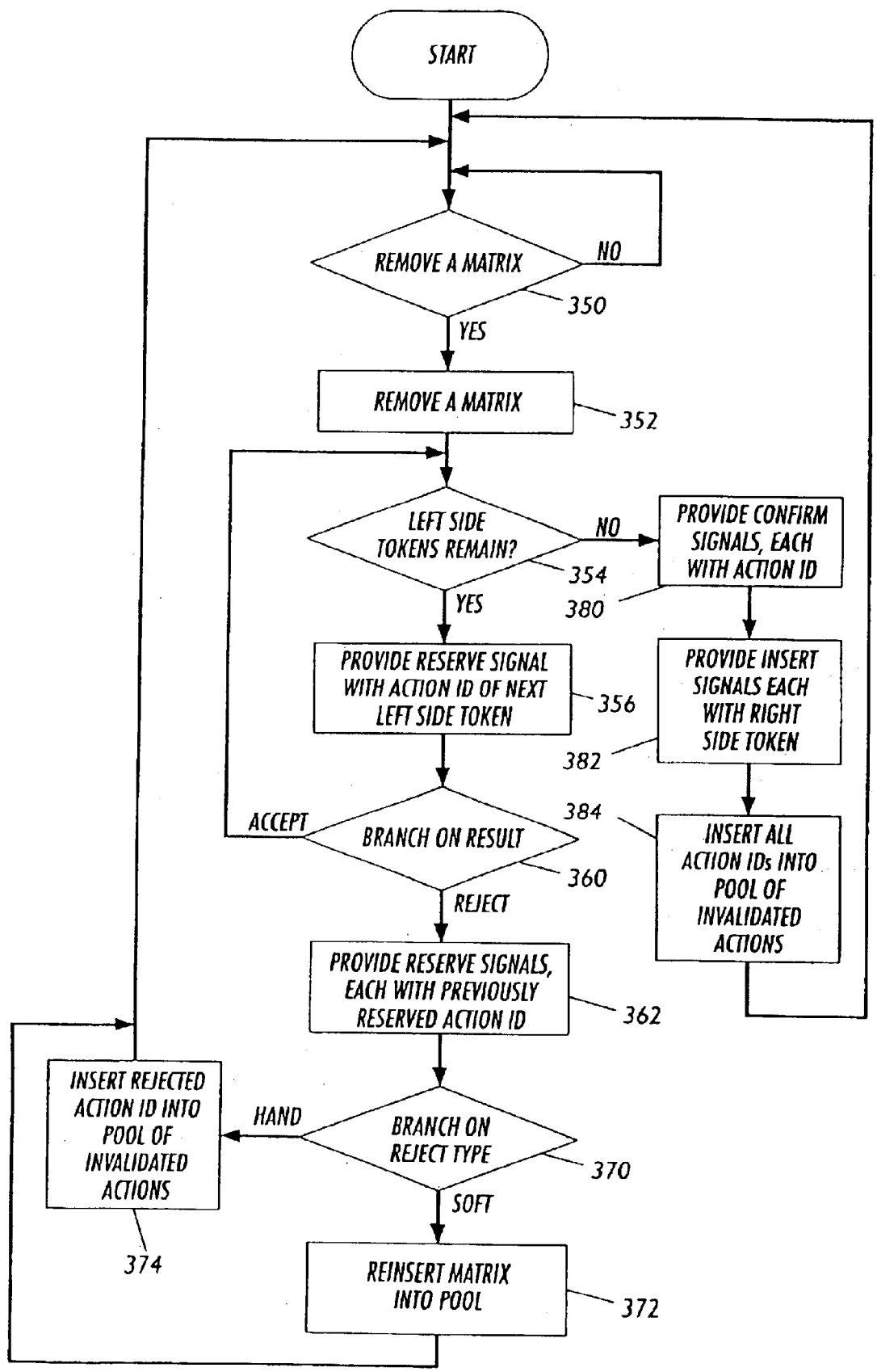
FIG. 10 is a flow chart showing acts that can be performed by a main transaction thread in FIG. 5.

FIG. 10 shows one way main transaction thread 182 in FIG. 5 can be implemented.

The act in box 350 provides two loops—a wait loop that is performed repeatedly whenever there are no closed matrices in pool 190, and an iterative loop that handles the closed matrices in pool 190 whenever any closed matrices are present. The iterative loop begins in box 352 by removing one of the closed matrices from pool 190 for handling.

A closed matrix could be obtained as an offspring of matrix M2 above, if an Inquiry signal for the second token, q(X, Y), has been provided with the instantiation "foo" of the variable X and an offer signal has been received with an action ID "A453254" for the second token and an instantiation "bar" of the variable Y. After the act in box 260 in FIG. 7 determines that all the left side tokens of the resulting new matrix are assigned, the act in box 266 would change its status to closed, so that the new matrix M3 could be as follows:

Rule: p(X)@q(X, Y)<>-r(Y)
Status: Closed
Variable instantiation: {X: "foo"; Y: "bar"}
Token assignment: {1: "A621534"; 2: "A453254"}
Distinguished token: None
Stream handle: None
Offspring: None The act in box 354 begins an inner iterative loop that handles each of the left side tokens in the matrix from box 352 until it reaches a left side token whose associated action ID is rejected. For that purpose, the act in box 356 provides a Reserve signal with the action ID from the next left side token to the server for that token. The act in box 360 branches based on the result from the server. If the server accepts the Reserve signal, another iteration is begun in box 354, but if the server rejects, the act in box 362 in effect aborts by providing Cancel signals, each with the action ID from one of the left side tokens that has been previously reserved in box 356. Then, the act in box 370 branches based on the type of rejection that was received from the server. If a soft rejection, the act in box 372 reinserts the matrix into pool of matrices 190, but if a hard rejection, the act in box 374 inserts the rejected action ID into pool of invalidated actions 194, before returning to begin another iteration in box 350.

When all the action IDs associated with left side tokens are successfully reserved, the act in box 380 provides Confirm signals, each with the action ID from one of the reserved left side tokens. Then the act in box 382 provides one or more Insert signals, each with one of the right side tokens of the rule. Finally, the act in box 384 inserts all the confirmed action IDs into pool of invalidated actions 194.

Figure 11:
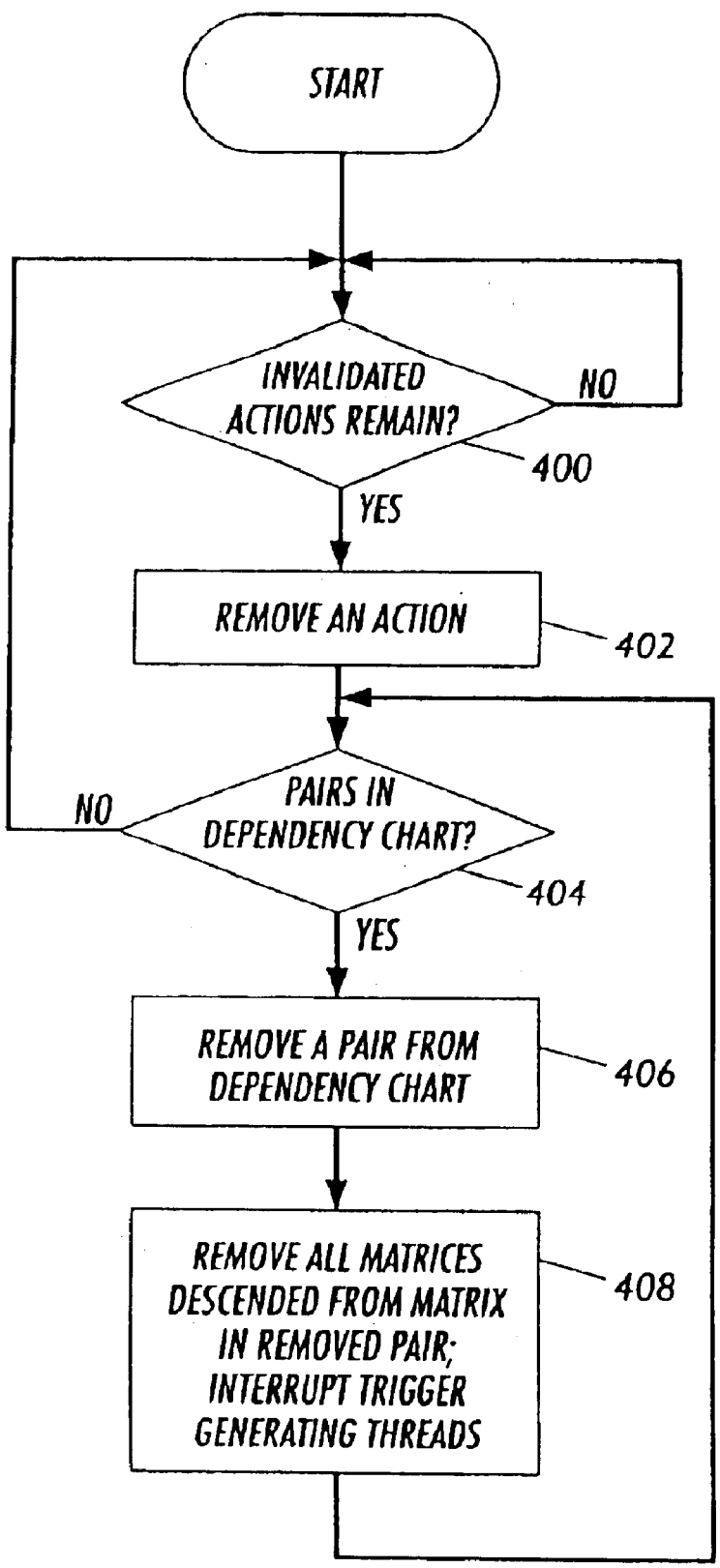
FIG. 11 is a flow chart showing acts that can be performed by a retroaction thread in FIG. 5.

FIG. 11 shows one way retroaction thread 184 in FIG. 5 can be implemented.

The act in box 400 provides two loops—a wait loop that is performed repeatedly whenever there are no invalidated actions in pool 194, and an iterative loop that handles invalidated actions in pool 194 whenever any are present. The iterative loop begins in box 402 by removing one of the invalidated actions from pool 194 for handling.

The act in box 404 begins an inner iterative loop that handles each pair in dependency chart 196 with the same action ID as the removed action. The act in box 406, a pair is removed from dependency chart 196. The act in box 408 removes all descendant matrices, i.e. offspring, offspring of offspring, etc., of the matrix identified in the removed pair and, for each removed matrix, interrupts each trigger generating thread 178 that was spawned with the matrix ID, so that the trigger generating thread provides a Kill signal to stop its stream in box 296. When all pairs with the action ID have been handled, another iteration begins in box 400.

Figure 12:
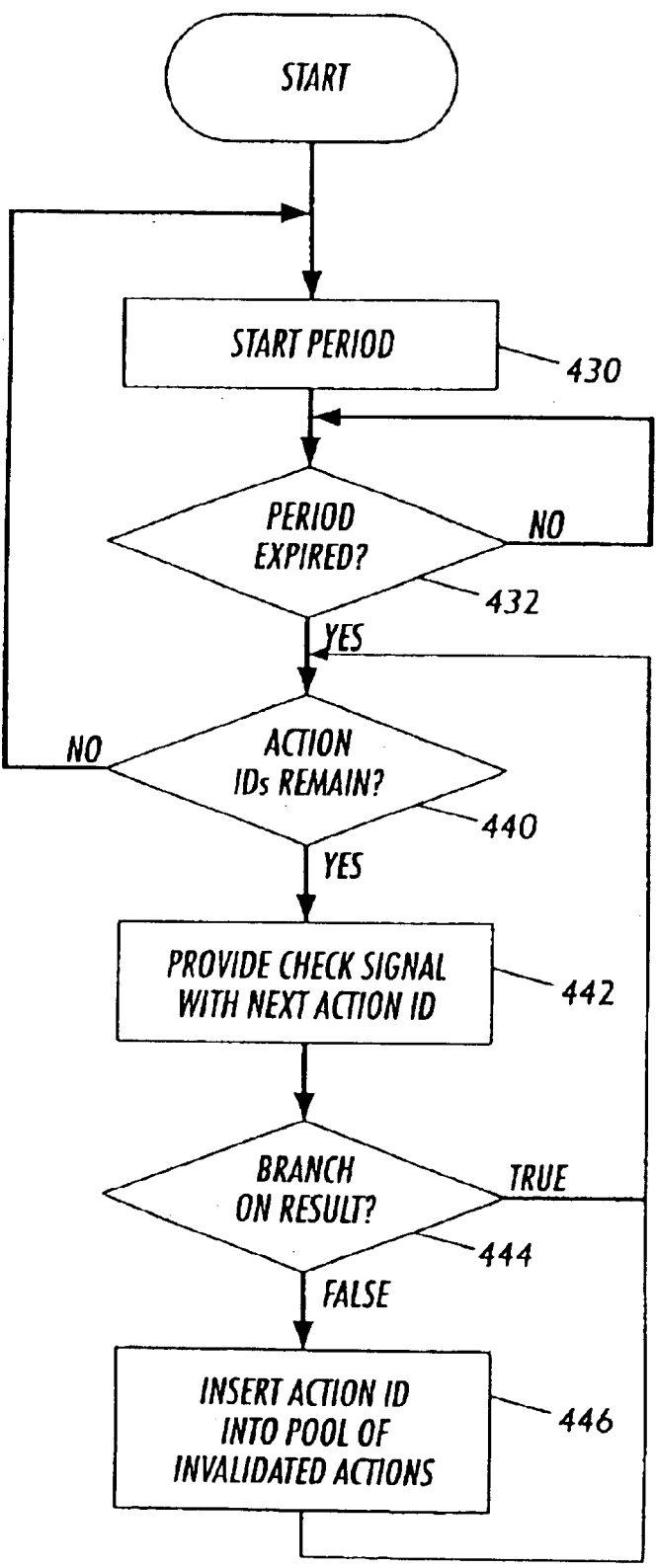
FIG. 12 is a flow chart showing acts that can be performed by a check polling thread in FIG. 5.

FIG. 12 shows one way check polling thread 186 in FIG. 5 can be implemented.

The act in box 430 begins an outer iterative loop by starting a period of time between iterations. The act in box 432 then provides a wait loop that is performed repeatedly until the period of time expires.

When the period has expired, the act in box 440 begins an inner iterative loop, each iteration of which handles one of the action IDs that occur in the matrices in pool of matrices 190. The act in box 442 provides a Check signal with the next action ID, and the act in box 444 branches on the result. If the server responded with FALSE, the action ID is inserted into pool of invalidated actions 194 before continuing to the next action ID. When all the action IDs have been handled, another period is started in box 430.

C.4. Variations

The implementation described above could be varied in numerous ways within the scope of the invention.

The implementation described above has been successfully executed using machines as mentioned above, but implementations could be executed on other machines.

The implementation described above has been successfully executed using programming environments and platforms as mentioned above, but other programming environments and platforms could be used.

The implementation described above is based on a client-server architecture in which servers provide software services, but the invention could be implemented in other types of architectures to obtain performance of various other kinds of actions from various other kinds of sources of actions. For example, peer-to-peer architectures based on asynchronous signal exchanges are perfectly suitable.

The implementation described above obtains combination data that indicate rules with left and right sides, and with the left side of each rule indicating a conjunction of action types, each of which is specified by a token that includes an identifier of a service available from a server and a set of variables, but various other kinds of rules or non-rule combination data could be used. For example, combinations of action types that are not purely conjunctive could be specified, and each action type could be available from more than one source. Also, some of the tokens could be tokens for obtaining input from a user or for obtaining other non-automatic actions, such as decision tokens that present information to a user at the client and use signals from the user to obtain output variables; decision tokens could be used, for example, to allow the user to choose a combination of offers that is acceptable. Rules could be used that can include other constraints, such as an upper limit on the number of offers that are taken into account for a token. Further, the combination data could be obtained in a variety of ways besides those mentioned above.

The implementation described above uses a search engine that provides inquiries of a particular type and uses action identifiers indicated by offers to generate combinations of offers in particular ways, operating similarly to general-purpose search algorithms for production rules, but inquiries of other types could be provided in various other ways and action identifiers could be used to generate combinations of offers in various other ways. For example, rather than pools of matrices and triggers as described above, various other kinds of data structures could be used to represent the search tree. Where compactness is an issue, the variable instantiation and token assignment in a newly built matrix could each be stored as an increment with respect to the parent matrix since matrices are built incrementally. The rule could simply be inherited, and need not be repeated. These and other such space optimizations have a cost in terms of access time, and any appropriate combination of space and access speed could be chosen.

The implementation described above builds a search tree and explores its branches concurrently in a way that mixes depth-first and breadth-first search and also prunes the tree when appropriate in accordance with a pool of invalidated actions. The invention could be implemented with other approaches to searching the possible combinations, including purely depth-first or purely breadth-first approaches or any mixture of the two (e.g. "iterative deepening"). Also, rather than expanding the search tree in response to every offer, some offers could be ignored, such as by using rules with filter constraints based, for example, on the number of offers.

The implementation described above generally does not attempt to reuse results, providing a distinct inquiry for every node in a tree without considering information obtained in response to previous inquiries. A large class of strategies could be employed to reduce the number of inquiries by reusing previous results.

One type of strategy is to detect incidental reuse dynamically. For example, the client can detect whether the same Inquire signal is being provided to the same server as previously. If so, the client can reuse the handle returned in response to the earlier Inquire signal, assuming the offers enumerated on the handle have been cached in the client. Conventional cache techniques and management policies can be adapted to avoid cache overflow, such as by maintaining cache usage data and discarding the least frequently used cache entry first.

Another type of strategy is to detect reuse statistically by analysis of the rules. This type of strategy allows special treatment of reuse. For example, if a rule contains two independent tokens as in $p(X)@q(X, Y)@r(X, Z) \ldots$ with the following signatures:

$p(X): \rightarrow X$ $q(X, Y): X \rightarrow Y$ $r(X, Z): X \rightarrow Z$ so that q- and r-offers depend on coffers but not on each other, then each q-offer will generate the same r-inquiry, because the r-inquiry depends only on the X-value in the initial coffer, and not on the Y-value returned in the q-offer. Obviously, all these r-inquiries could be cached and reused.

Also, the implementation described above uses a transaction engine that uses action identifiers to obtain performance in specific ways, operating similarly to a standard two-phase commit algorithm used in transaction schedulers such as for relational databases, but action identifiers could be used to obtain performance in various other ways. Rather than ensuring, whenever possible, atomic execution of a selected combination of offers, followed by notification of each service on the right hand side of a rule, a less rigorous approach could be taken, with or without notification.

In the implementation described above, the transaction engine is strictly sequential, in the sense that it tries the actions in a generated combination of offers in sequence. This approach allows a simple backtrack procedure in case of failure, but possibly at the price of late failure detection. An alternative approach is to try all the reservations in parallel, in which case backtrack management becomes slightly more complex.

The implementation described above uses action identifiers that are uninterpreted strings produced by servers and that are not unique to any offer but rather identify an action that a server could perform if it receives the action identifier with a request to perform, but action identifiers could be produced by clients or other sources and could include additional information, such as an identifier of an offer.

In the implementation described above, the search tree is pruned using a pool of invalidated actions and a dependency chart, but pruning could be performed in various other ways, with various other data structures to retain information about parts of the search space that could be pruned and about dependencies between action identifiers and parts of the search space.

In the implementation described above, specific acts are performed that could be omitted or performed differently.

Similarly, specific data structures are employed that could be omitted or structured differently.

In the implementation described above, acts are performed in an order that could be modified in many cases. For example, as noted above, inquiries could be provided asynchronously or in parallel, offers could be received asynchronously or in parallel, and combinations of offers could be generated asynchronously or in parallel. Parallel operations could be distributed among parallel processes on a serial processor or among parallel processors. Furthermore, inquiries, offers, and generation of combinations of offers could be performed in a synchronous manner. Also, acts could be reordered, such as the acts in boxes 380, 382, and 384 in FIG. 10 or the acts in boxes 406 and 408 in FIG. 11.

The implementation described above uses currently available computing techniques, but could readily be modified to use newly discovered computing techniques as they become available.

D. Applications

In general, the invention can be applied to provide a generic coordination facility.

Specifically, the invention can be applied in software applications where components are capable of making autonomous choices but may conflict for resources needed to implement choices. Potential application domains that have been explored with the technique described above include:

Distributed workflow in which individual tasks can be performed in multiple alternative ways according to decisions made by empowered workers (within specified limits), with possible conflicts between tasks for scarce resources. In this domain, search techniques can be used to explore the possibilities when a task defined by the goal can be performed by different teams or by the same team in different ways, possibly at different costs and using different resources. If the task involves collaborative participation of several empowered workers, each of whom can propose several ways to perform one share, the search may have to explore combinations of interdependent offers, such as where a software task requires collaboration of two programmers, one providing an API that is used by the other. Once a combination is selected, transaction techniques can perform the operations to achieve the goal.

Electronic commerce in which several options for satisfying a customer's request may have to be explored, but may not all be feasible due to conflicts between choices; a simple example of such a conflict might be a request delivery within one day even though the requested item requires more than one day for delivery. In this domain, search can be used to propose various combinations of items, possibly from different providers, that satisfy a customer's requirements. Choices proposed by the providers may be interdependent, such as where a customer requires a camera box and a compatible lens, or where items from different providers must support the same kind of payment services. Once a combination is selected, transaction techniques can perform the resulting commercial transaction.

The invention is applicable in many other domains that have similar characteristics. Domains in which the invention is applicable will typically involve coordination of distributed activities.

The invention could thus be applied in implementing middleware for distributed computing, electronic commerce, and workflow.

The invention is likely to be especially useful in coordinating heterogeneous, autonomous, distributed components in an open world such as the Internet. The adoption of object-oriented software development has resulted in a multitude of components that, even when properly encapsulated inside an interface, are not easy to manipulate and combine to build applications they were not originally designed for.

E. Miscellaneous

The invention has been described in relation to software implementations, but the invention might be implemented with specialized hardware.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. A computer implemented method of obtaining performance of combinations of actions, the method comprising:
   (a) obtaining combination data indicating a combination of two or more action types;
   (b) generating one or more combinations of offers, the offers in each combination together offering the combination of action types indicated by the combination data; the act of generating combinations of offers comprising:
      providing inquiries to sources of actions, each inquiry indicating at least one of the action types in the combination, each inquiry further requesting offers that offer to perform actions of the indicated type and that each indicate an action identifier identifying the offered action; and
      using offers received in response to the inquiries to generate the combinations of offers; and
   (c) using action identifiers from the offers in any of the generated combinations to obtain performance of that combination of actions by the sources.

2. The method of claim 1 in which the sources of actions are servers and in which the combination data indicate, for each action type in the combination of action types, at least one service identifier, each service identifier identifying a service that can be performed by a server to provide an instance of the action type.

3. The method of claim 2 in which the servers are accessible through a network and in which the servers perform the services by executing instructions.

4. The method of claim 2 in which the combination of action types is a conjunction and in which (b) comprises:
   (b1) associating action identifiers indicated by offers with service identifiers that are indicated by the combination data; and
   (b2) determining whether all service identifiers indicated by the combination data have associated action identifiers.

5. The method of claim 2 in which the combination data further indicate, for each service identifier, a set of one or more variable identifiers, each variable identifier identifying a variable that is applicable to the service identified by the service identifier, the sets of variable identifiers for first and second service identifiers both including one or more shared variable identifiers identifying shared variables that are applicable both to a first service identified by the first service identifier and to a second service identified by the second service identifier.

6. The method of claim 5 in which (b) comprises:
   (b3) providing a first inquiry to a first set of servers, each of which can perform the first service; the first inquiry indicating the first service with the shared variables unspecified and requesting that the servers in the first set provide offers that offer to perform the first service;
   (b4) receiving at least one offer in response to the first inquiry, each offer offering to perform the first service with specified values of the shared variables; and
   (b5) for at least one offer received in (b4), providing a second inquiry to a second set of servers, each of which can perform the second service, the second inquiry indicating the second service with the specified values of the shared variables from the received offer and requesting that the servers in the second set provide offers that offer to perform the second service with the specified values of the shared variables from the received offer.

7. The method of claim 1 in which the combination of action types is a conjunction and in which (c) comprises:
   (c1) for each offer in the generated combination, providing a reserve request to the source of the offer; the reserve request signal indicating the offer's action identifier, the reserve request requesting a return communication indicating whether the offer is available and reserved; and
   (c2) if return communications are received indicating that all the offers in the generated combination are available and reserved, providing a perform request to the source of each offer, each perform request indicating the offer's action identifier and requesting performance of the identified action.

8. The method of claim 7 in which the reserve request also indicates a requester identifier and requests that the source reserve the action identified by the action identifier for the identified requester.

9. A system for obtaining performance of combinations of actions, the system comprising:
   processing circuitry; and
   connecting circuitry for connecting the processing circuitry to sources of action;
   the processing circuitry:
      (A) obtaining combination data indicating a combination of two or more action types;
      (B) generating one or more combinations of offers, the offers in each combination together offering the combination of action types indicated by the combination data; the processing circuitry, in generating the combinations of offers:
         providing inquiries to the sources of actions through the connecting circuitry, each inquiry indicating at least one of the action types in the combination, each inquiry further requesting offers that offer to perform actions of the indicated type and that each indicate an action identifier identifying the offered action; and
         using offers received through the connecting circuitry in response to the inquiries in generating the combinations of offers; and
      (C) using action identifiers from the offers in any of the generated combinations in obtaining performance of a combination of actions by the sources.

10. The system of claim 9 in which the connecting circuitry includes circuitry for connecting the processing circuitry to the Internet.

11. The system of claim 9, further comprising:

memory circuitry connected for access by the processing circuitry; the memory circuitry storing instruction data defining instructions the processing circuitry can execute; the instructions including search engine instructions that the processing circuitry executes to perform (B) and transaction engine instructions that the processing circuitry executes to perform (C).

12. The system of claim 9 in which the sources of actions are servers and in which the combination data indicate, for each action type in the combination of action types, at least one service identifier, each service identifier identifying a service that can be performed by a server to provide an instance of the action type, the system further comprising:

memory circuitry connected for access by the processing circuitry; the memory circuitry storing a set of service combination data items; each service combination data item indicating a combination of service identifiers that could be an instance of the combination of action types indicated by the combination data.

13. The system of claim 12 in which (B) includes:

(B1) updating the set of service combination data items by associating action identifiers indicated by offers with service identifiers; and (B2) using the set of service combination data items in determining whether all service identifiers indicated by the combination data have associated action identifiers.

14. The system of claim 13 in which the memory circuitry further stores a set of trigger data items, each trigger data item indicating an action identifier indicated by an offer received in response to an inquiry; and in which (B1) includes:

for one of the trigger data items, creating a new service combination data item in which the action identifier from the trigger data item is associated with the service identifier indicated by the inquiry.

15. The system of claim 14 in which (B2) includes:

for one of the service combination data items that indicates a service identifier that does not have an associated action identifier, providing an inquiry that indicates the service identifier and, for each offer received in response to the inquiry, creating a trigger data item that indicates the action identifier indicated by the offer.

16. The system of claim 13 in which (C) includes:

for one of the service combination data items in which each service identifier has an associated action identifier, using the action identifiers associated with the service identifiers in obtaining performance of a combination of actions by the sources.

17. The system of claim 16 in which the memory circuitry further stores a set of invalid action data items; each invalid action data item indicating an action identifier; and in which (C) further includes:

for each of the action identifiers used in obtaining performance, creating in the set of invalid action data items an invalid action data item that indicates the action identifier; and for each invalid action data item in the set, using the action identifier indicated by the invalid action data item to remove service combination data items having service identifiers with which the action identifier is associated.

18. The system of claim 9 in which (C) includes:

providing perform requests to the sources that provided the generated set of offers, each perform request indicating an offer's action identifier and requesting performance of the identified action;

the system further comprising:

a set of servers that are the sources of actions; each server being connected to the processing circuitry through the connecting circuitry; each server responding to an inquiry by determining whether to provide an offer and, if so, providing an offer that indicates an action identifier; each server responding to a perform request that indicates an action identifier by performing the action identified by the indicated action identifier.

19. An article of manufacture for use in a system that includes:

a storage medium access device for accessing data on storage media; and a processor for accessing data on storage media using the storage medium access device; and connecting circuitry for connecting the processor to sources of actions;

the article of manufacture comprising:

a storage medium;

instruction data stored on the storage medium, the instruction data defining a sequence of instructions that can be accessed by the processor using the storage medium access device; the processor, in executing the sequence of instructions, obtaining performance of combinations of actions by:

obtaining combination data indicating a combination of two or more action types;

generating one or more combinations of offers, the offers in each combination together offering the combination of action types indicated by the combination data; the processor, in generating the combinations of offers:

providing inquiries to the sources of actions through the connecting circuitry, each inquiry indicating at least one of the action types in the combination, each inquiry further requesting offers that offer to perform actions of the indicated type and that each indicate an action identifier identifying the offered action; and using action identifiers indicated by offers received through the connecting circuitry in response to the inquiries in generating the combinations of offers; and using offers in any of the generated combinations in obtaining performance of a combination of actions by the sources.

20. A method of operating a first machine to transfer data to a second machine over a network, the second machine including:

at least one device that can be used to access resources; each device, when used by a person, providing identity information indicating the person's identity;

a memory for storing instruction; and a processor connected for receiving the identity information and the content of the accessed resources and for accessing the memory;

the method comprising:

establishing a connection between the first and second machines over the network; and operating the first machine to transfer instruction data to the memory of the second machine; the instruction data indicating instructions the processor can execute; the processor, in executing the sequence of instructions, obtaining performance of combinations of actions by:

obtaining combination data indicating a combination of two or more action types;

generating one or more combinations of offers, the offers in each combination together offering the combination of action types indicated by the combination data; the processor, in generating the combinations of offers:

providing inquiries to the sources of actions through the connecting circuitry, each inquiry indicating at least one of the action types in the combination, each inquiry further requesting offers that offer to perform actions of the indicated type and that each indicate an action identifier identifying the offered action; and using offers received through the connecting circuitry in response to the inquiries in generating the combinations of offers; and using action identifiers from the offers in any of the generated combinations in obtaining performance of a combination of actions by the sources.

\* \* \* \* \*